(12) United States Patent
Hertwig et al.

(10) Patent No.: US 7,761,644 B1
(45) Date of Patent: Jul. 20, 2010

(54) MEMORY SHARING ARRANGEMENT FOR AN INTEGRATED MULTIPROCESSOR SYSTEM

(75) Inventors: Axel Hertwig, Nürnberg (DE); Harald Bauer, Nürnberg (DE); Urs Fawer, Baden (CH); Paul Lippens, Eindhoven (NL)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 09/640,729

(22) Filed: Aug. 17, 2000

(30) Foreign Application Priority Data

Aug. 21, 1999 (DE) .............................. 199 39 763

(51) Int. Cl.
*G06F 1/00* (2006.01)
(52) U.S. Cl. .................. 710/312; 710/313; 710/300; 710/27; 710/308; 710/307; 711/147
(58) Field of Classification Search ......... 710/240–244, 710/305, 306, 307, 308, 309, 311, 107, 110, 710/316; 709/208–216; 712/10, 16, 28, 712/29, 31, 34–35; 711/130, 131, 147, 148, 711/149
See application file for complete search history.

(56) References Cited

U.S. PATENT DOCUMENTS 4,881,164 A * 11/1989 Hailpern et al. ............. 711/207
5,535,417 A * 7/1996 Baji et al. ..................... 710/22
5,592,677 A * 1/1997 Intrater et al. ................. 712/1
5,685,005 A * 11/1997 Garde et al. .................. 712/1
5,727,219 A * 3/1998 Lyon et al. ................. 710/268
5,867,726 A * 2/1999 Ohsuga et al. ............... 709/20
5,903,771 A * 5/1999 Sgro et al. .................. 712/20
5,933,855 A * 8/1999 Rubinstein ................. 711/200
5,974,493 A * 10/1999 Okummura et al. ......... 710/127
6,163,828 A * 12/2000 Landi et al. ................. 710/240
6,353,863 B1 * 3/2002 Nakagawa et al. ............ 710/5
6,526,462 B1 * 2/2003 Elabd ......................... 710/242
6,601,126 B1 * 7/2003 Zaidi et al. .................. 710/305

FOREIGN PATENT DOCUMENTS

EP     1 067 461 A1 *   8/1999

* cited by examiner

*Primary Examiner*—Tim Vo
*Assistant Examiner*—Raymond N Phan
(74) *Attorney, Agent, or Firm*—Robert Iannucci; Seed IP Law Group PLLC

(57) ABSTRACT

A multiprocessor system, more particularly for terminal devices of mobile radiotelephony, in which system are arranged on a common chip:
  at least two processors,
  at least one rewritable memory which can be accessed by the two processors,
  at least one cache memory via which the first processor has access to the memory,
  at least one bridge via which the second processor has access to the memory.

12 Claims, 1 Drawing Sheet

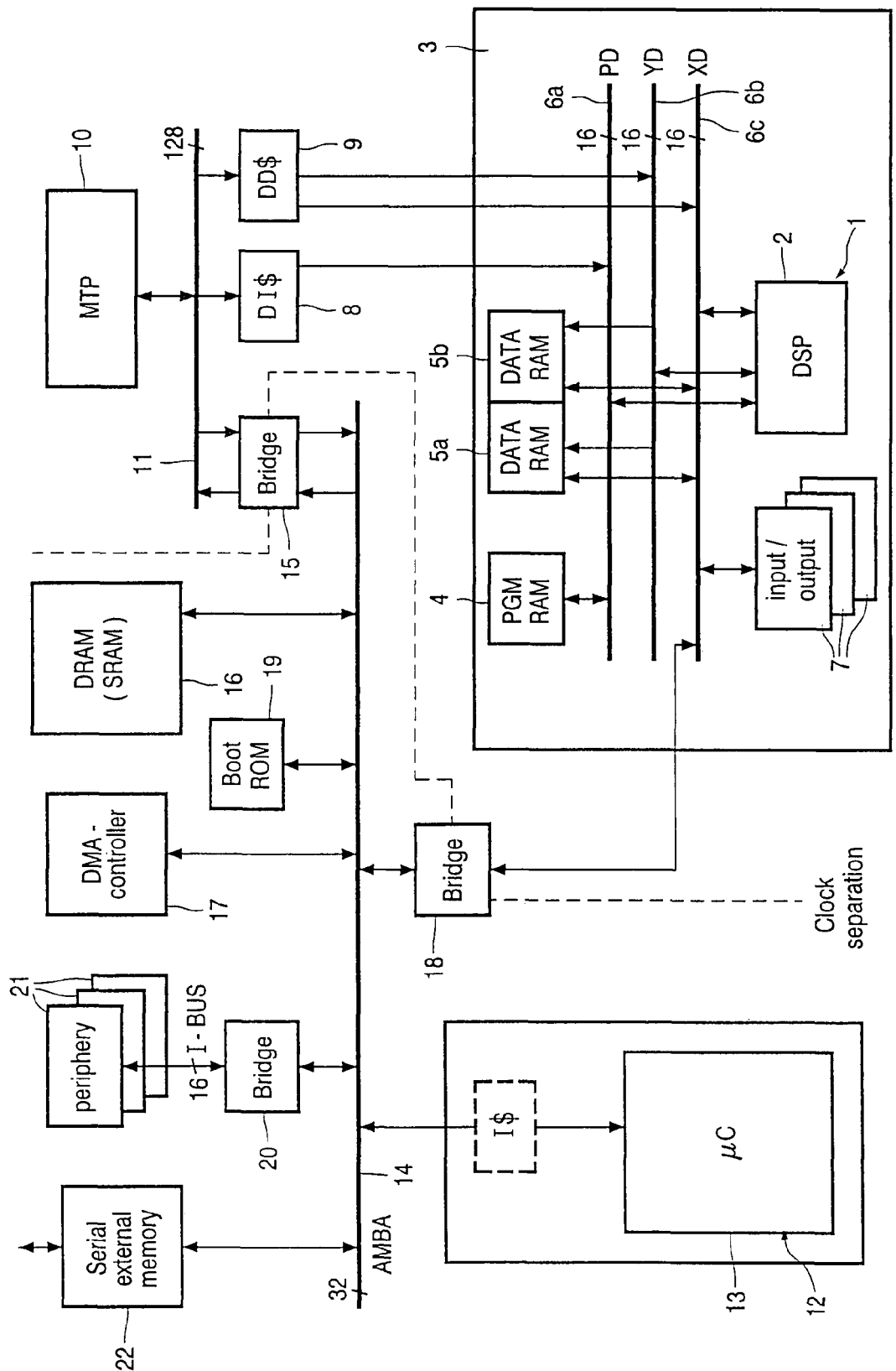

MEMORY SHARING ARRANGEMENT FOR AN INTEGRATED MULTIPROCESSOR SYSTEM

FIELD OF THE INVENTION

The invention relates to a multiprocessor system, more particularly for terminal devices of mobile radiotelephony.

BACKGROUND OF THE INVENTION

In terminal devices of mobile radiotelephony are used nowadays multiprocessor systems in which two processors are provided on one chip. One processor may be understood to be a system microcontroller which is provided for medium-power protocol and control tasks, whereas the other processor may be a powerful digital signal processor. For each processor there is at least one memory external to the chip, thus for example an external FLASH program memory, or a respective external data memory. In this system a certain memory is assigned to only one processor, that is to say, only this processor can access the defined memory. Such a system configuration, however, is disadvantageous in various respects. The respective chip is to be provided with a plurality of pins for the communication of the various chips included in the processors, on the one hand, and the separate memories, on the other. Furthermore, the power consumption for the program and data communication is considerably large. The described configuration also requires considerably much space, which is a disadvantage especially in the terminal devices which become ever smaller.

BRIEF SUMMARY OF THE INVENTION

For this purpose, the invention has for its object to provide a multiprocessor system which in the area of telecommunications technique and, more particularly, in terminal devices of mobile radiotelephony, is improved in comparison with the state of the art.

For solving this problem in a multiprocessor system, more particularly for terminal devices of mobile radiotelephony, the following is arranged on a common chip:

at least two processors, at least one rewritable memory to which the two processors can have access, at least one cache memory via which the first processor has access to the memory, and at least one bridge via which the second processor has access to the memory.

In the processor system according to the invention, the processors and also at least one rewritable memory to which the two processors can have access and can extract or write respective information, are advantageously integrated on a common chip. The first processor, which may be, for example, a digital signal processor, is connected to the rewritable memory via at least one cache memory. The access of the second processor, which may be a system microcontroller, is realized via at least one bridge. According to the invention the integration of said elements on a common chip enables a communication between the processors and the memory on the chip and, since the memory is not an external memory, no pins can be provided at all. The integration rate of the chip is increased considerably. The current necessary for the communication between the processors and the memory is considerably less too, because a chip-integrated memory generally optimizes the power consumption of a system. The system architecture described may be used, more particularly, in terminal devices of mobile radiotelephony in the GSM standards DCS1800, PCS1900, IS95 and IS136.

The two processors can work with mutually different operating rates. Furthermore, there may be provided that the memory is connected to the first processor via two cache memories, one of which is used for access to the memory for reading or writing a program and the other of which is used for access to the memory for reading out data. The non-volatile rewritable memory thus has various memory areas in which different information can be stored. Program and data for each of the connected processors may be stored freely in the non-volatile rewritable memory. Via the two cache memories, which are high-speed buffers, there is ensured that the data or information to be retrieved from the relatively slowly operating memory are available to the high-speed first processor or the digital signal processor respectively. The two cache memories further enable a simple access of the second processor (for example, microcontroller) to the memory, because it is ensured via the cache memory that the first processor (for example, digital signal processor) does not continuously retrieve data from the memory and occupies this memory because the essential data needed by the first processor or the digital signal processor respectively, usually have already been stored in the two cache memories and are retrieved from there, so that the memory is not continuously occupied by the first processor and also the second processor can access the memory via the bridge.

As has been described, the memory is advantageously subdivided into separate memory areas for a program and for data. The respective processors may then be assigned separate memory areas for programs and for data, that is to say, for example two program areas are available of which one area is assigned to the first processor or digital signal processor respectively, and the other area is assigned to the second processor or system microcontroller respectively, as also respective data memory areas are provided. All in all, this provides the possibility of partitioning the memory areas as desired. However, it is necessary to determine the total required memory space before a first implementation; the partitioning may then be set at will. Obviously, it is also possible to provide a further memory area for data which can be accessed by the two.

In a further embodiment of the invention the bridge may be arranged for the synchronization between a first data bus by which the memory communicates, and a second data bus by which the second processor communicates, and which is narrower as regards the transmission width. The complete integration of the said system components on a chip enables the formation of data buses in a simple manner. Since the integrated memory is to effect high transmission rates especially in the scope of the communication with the first processor or the digital signal processor respectively, it is efficient to assign to this integrated memory a data bus having a large transmission width via which the data can be delivered to the first processor that works with a high clock frequency. Since the second processor works with a lower clock and, therefore, more slowly, it is sufficient to assign a data bus having a lower transmission rate to this second processor. However, since the second processor can now also access the rewritable memory, it is necessary to accordingly synchronize the information to the second data bus via the first data bus, which is done in a simple manner by means of the bridge. It has proved to be efficient for the data bus assigned to the memory to have a transmission width of 128 bits and for the data bus assigned to the second processor to have a transmission width of 32 bits.

As described, the use of the cache memory (memories) achieves that the first processor or the digital signal processor respectively, does not continuously occupy the rewritable memory or the data bus assigned thereto, it is rather a discontinuous access to the memory, only when new information is to be loaded into the cache memory (memories). If, nevertheless, there were an access conflict when at the same time also the first processor would like to access the memory, this conflict would be solved according to the invention by means of the bridge which is arranged for managing the access to the memory, so that in the case of a conflict of access preferably the first processor is served, because this processor generates the larger load and is to satisfy the stricter real-time requirements. The bridge is thus arranged both for synchronization and for arbitration.

For storing mainly volatile variable data, it has proved to be efficient when a further chip-integrated data memory is connected to the second processor via a data bus. In this data memory are stored short-term data, for example, computed data which will soon be overwritten again. For enabling also the first processor or the digital signal processor respectively to access the further data memory, according to the invention a DMA controller and also a second bridge can be integrated on a chip. The combination of the DMA controller and the second bridge enables in a simple manner the access to the relatively slowly operating further data memory. All in all, this embodiment now provides a system with various processors and various memories integrated on a common chip, each processor being capable of accessing each memory, so that an extremely functional information transfer and operation is made possible.

Furthermore, it has proved to be advantageous when at least an internal high-speed data memory and/or at least an internal high-speed program memory is assigned to the first processor. In these high-speed memories are preferably stored time-critical program portions, which are immediately to be available to the first processor or the digital signal processor respectively, or modifiable variable data which are also to be available immediately. The first processor can in this context have a double Harvard architecture in which each provided data or program memory is assigned its own bus for data words or program words.

The rewritable memory can, according to the invention, be an MTP memory (Multiple Programmable Memory) or a FLASH memory. The further data memory in the second processor may be a DRAM (Direct Random Access Memory) or a SRAM (Static Random Access Memory). The internal high-speed data memory and/or the internal high-speed program memory may be a RAM. Furthermore, there may also be provided a direct communication link between the two processors.

As a result of the multiprocessor system according to the invention there are many advantages over the state of the art. On the one hand, the partitioning between the processors and between program area and data area inside the integrated rewritable memory can be changed at will, as described, only the total memory capacity of the system is to be definite when the chip is manufactured. Due to the possibility of rewriting the memory in which the program for operating the respective device is stored, new software versions both for the system controller and for the signal processor can be loaded in a simple and high-speed manner. The integration of the memory (various memories) on the chip optimizes the power consumption of the system and reduces the number of pins on the housing of the chip or allows the available pins to be occupied differently. This leads to a saving of cost and space. As a result of the mechanisms to access the memories, the dimensioning of the cache memories and of the local memories, the slightly longer time of access to the rewritable memory is compensated in a simple manner at the least cost. Finally, the combination of a plurality of memories or the individual partitioning and distribution of the memory areas in the rewritable memory integrated on a chip reduces the implementation overhead and the necessary chip surface.

Besides the multiprocessor system itself, the invention further relates to a utilization of the multiprocessor system of the type described above for operating a telecommunication terminal of mobile radiotelephony.

Further advantages, features and details of the invention will be apparent from the example of embodiment described hereinafter and from the drawing.

BRIEF DESCRIPTION OF THE DRAWING

FIG. 1 is a diagram of the present invention.

DETAILED DESCRIPTION OF THE PREFERRED EMBODIMENTS

The FIGURE shows in the form of a basic circuit diagram the elements configured or integrated respectively on a chip, which is not further shown. A first processor 1 is shown in the form of a digital signal processor 2 (DSP). The digital signal processor 2 is a powerful processor having an output of 25-100 MIPS (Millions of Instructions Per Second). In the processor sub-system 3, represented by the box shown in the Figure, is further provided an internal high-speed program memory 4 in the form of an integrated RAM in which time-critical program portions are stored which are briefly necessary for the signal processor. Furthermore, two integrated high-speed data memories 5 are provided for storing volatile short-term data. Separate buses 6a, 6b, 6c having a transmission rate of 16 bits each are assigned to the memories 4, 5. Via these buses the signal processor 2 communicates with the respective memories. The program memory 4 may have a storage capacity of, for example, 2×16 k with a transmission width of 16 bits, the data memory 5 may be designed to have a storage capacity of 8×16 k and a transmission width of 16 bits. Furthermore, the processor sub-system 3 includes a plurality of input and output units 7 via which, on the one hand, data can be output from the data memories 5 and can be input to them respectively, and also data from a further data memory which will be described hereinafter.

To the digital signal processor 2 or the processor sub-system 3 respectively are assigned two cache memories 8, 9 via which the digital signal processor 2 can access a rewritable memory 10 also integrated on the chip, which memory 10 is arranged as an MTP memory in the example shown. The communication between the cache memories 8, 9 and the rewritable memory 10 is effected via a data bus 11 which has a preferred transmission width of 128 bits. The memory 10 is subdivided into different memory areas while there is a possibility of writing or reading out, on the one hand, a program and, on the other hand, the constant data. Each area is in its turn subdivided and assigned either to the digital signal processor 2 or to a second processor 12 in the form of a system microcontroller 13 (μC) which, as will be further described hereinafter, also has access to the memory 10. The access to the program values takes place via the cache memory 8, the access to the data words via the cache memory 9. By means of the cache memories, which work as high-speed buffer memories, there is ensured that the digital signal processor 2 does not continuously occupy the data bus 11, the necessary data are rather read from the cache memories 8, 9 in which the necessary information is buffered. The cache memories 8, 9 communicate with the digital signal processor via the respective buses 6a, 6b and 6c. Conditional to this communication link it is also possible to output words from the memory 10 or the cache memories 8, 9 respectively via the output units 7. The memory 10 is to have a storage capacity of at least 0.5-2 megabytes with a transmission width of 128 bits. Obviously it is alternatively possible to dimension them larger. The cache memories, in the case of the cache memory 8, may have a capacity of 512 bytes, the capacity of the cache memory 9 may be 64 bytes.

As already described, the chip further accommodates a second processor in the form of a system microcontroller 13. Assigned to this microcontroller is a second data bus 14 which has a transmission width of 32 bits. To enable the system microcontroller 13 to access the relevant program and data portions relevant to it in the memory 10, a bridge 15 is provided via which the system microcontroller 13 can have access via the data bus 14. The bridge is used, on the one hand, for the synchronization between the two data buses 11, 14 because the two work with different clocks—as do the digital signal processor 2 and the system microcontroller 13—which is denoted by the dashed line "clock separation". The digital signal processor and all the components assigned thereto work with a working clock pulse of, for example, 26-104 MHz, whereas the system microcontroller and the respective elements assigned thereto work with a working clock pulse of, for example, 26 MHz. In addition, the bridge 15 also takes over arbitration tasks, so that it always permits the digital signal processor 2 or cache memory 8, 9 to have preferred access to the memory 10. Furthermore, there is a possibility of using the bridge 15 as a small cache memory, so that fewer memory accesses from the side of the system microcontroller to the memory 10 are necessary. In this manner, also any possible waiting cycles with respect to the system microcontroller accessing the memory are shortened.

To the system microcontroller 13 is further assigned a further data memory 16 in the form of a DRAM or SRAM integrated on the chip. This data memory may have a capacity of 32 k with a transmission width of 32 bits on the data bus 14. The system microcontroller 13 has immediate access to the further data memory 16. In order to also enable the digital signal processor 2 to have access to the further data memory in which volatile short-term data are stored, a DMA controller 17 is provided which is also connected to the data bus 14, and a further bridge 18 which is connected to the sub-system internal bus 6c. It is true, the further data memory 16 works very slowly compared to the high clock frequency of the digital signal processor 2, as a result of which it will rarely be accessed. This access, however, is possible by means of the DMA controller 17 and the bridge 18, which bridge is again arranged for the synchronization between the different data buses and the clock frequencies.

To the data bus 14 is further connected a boot ROM 19 via which the original configuration of the memory 10 and the original inputting of the program and possible data is effected.

Furthermore, various peripheral elements 21 integrated on a chip, such as interfaces to external components or the like, are connected via a third bridge 20. Besides, via a respective terminal device 22, a chip-external further memory, for example a FLASH memory can be connected. This FLASH memory is used for extending the memory 10 integrated on the chip when its memory capacity is no longer sufficient. The external memory is connected as an input/output unit of the system microcontroller 13. The digital signal processor 2 can access this external memory via the DMA controller 17 and the bridge 18.

It is obvious that the said memory dimensioning and the design of the transmission rates and the transmission widths of the data buses used may be changed in dependence on the respective application.

The invention claimed is:

1. An electronic product, comprising:
 a first processor coupled to an instruction cache and to a data cache;
 a first bus coupled to the instruction cache and to the data cache;
 a first memory coupled to the first bus;
 a second processor coupled to a second bus;
 a first bus bridge coupled to the first bus and to the second bus, the first bus bridge providing a path for transferring data between the first memory and the second processor;
 a second memory coupled to the first bus;
 a second bus bridge coupled to the second bus and a third bus, the third bus providing a data pathway within the first processor, the second bus bridge providing a path for transferring data between the second memory and the third bus of the first processor; and
 a direct memory access (DMA) controller coupled to the second bus, the DMA controller configured to manage a transfer of data between the second memory and the second bus bridge;
 wherein the first processor is configured to operate at a first frequency, the second processor is configured to operate at a second frequency, and the first frequency is greater than the second frequency, and wherein the first bus and the second bus are dissimilar.

2. The electronic product of claim 1, wherein the first processor and the second processor are both disposed together on a single integrated circuit.

3. The electronic product of claim 2, wherein the first processor is a digital signal processor, and the second processor is a microcontroller.

4. The electronic product of claim 3, wherein a first portion of the first memory is dedicated to the first processor, a second portion of the first memory is dedicated to the second processor, and a third portion of the first memory is shared by the first and the second processors.

5. The electronic product of claim 4, wherein the first bus has a first width, the second bus has a second width, and the third bus has a third width; the first width is greater than the second width, and the second width is greater than the third width.

6. The electronic product of claim 5, wherein the DMA controller and the second bus are both disposed on the single integrated circuit.

7. The electronic product of claim 6, wherein the first bus has a width of 128 bits, the second bus has a width of 32 bits, and the third bus has a width of 16 bits.

8. The electronic product of claim 6, further comprising a Read Only Memory (ROM) disposed on the single integrated circuit and coupled to the second bus.

9. A mobile radiotelephony controller, comprising:
 a digital signal processor coupled to an instruction cache and to a data cache;
 a first bus coupled to the instruction cache and to the data cache;
 a first memory coupled to the first bus;
 a microcontroller coupled to a second bus;

a first bus bridge coupled to the first bus and to the second bus, the first bus bridge providing a path for transferring data between the first memory and the microcontroller;

a second memory coupled to the first bus;

a second bus bridge coupled to the second bus and a third bus, the third bus providing a data pathway within the digital signal processor, the second bus bridge providing a path for transferring data between the second memory and the third bus of the digital signal processor; and a direct memory access (DMA) controller coupled to the second bus, the DMA controller configured to manage a transfer of data between the second memory and the second bus bridge;

wherein the digital signal processor is configured to operate at a first frequency, the microcontroller is configured to operate at a second frequency, and the first frequency is greater than the second frequency, wherein the first bus and the second bus are dissimilar, and wherein a first portion of the first memory is dedicated to the digital signal processor, a second portion of the first memory is dedicated to the microcontroller, and a third portion of the first memory is shared by the digital signal processor and the microcontroller.

10. The mobile radiotelephony controller of claim 9, further comprising a ROM coupled to the second bus.

11. The mobile radiotelephony controller of claim 10, wherein the first bus has a first width, the second bus has a second width, and the third bus has a third width; the first width is greater than the second width, and the second width is greater than the third width.

12. The mobile radiotelephony controller of claim 11, wherein the digital signal processor, the microcontroller, the DMA controller, the ROM, the first memory, and the second memory are all disposed on the same single integrated circuit.

* * * * *